United States Patent [19]

Tanaka

[11] Patent Number: 5,641,255

[45] Date of Patent: Jun. 24, 1997

[54] CLIP

[75] Inventor: Tsutomu Tanaka, Yokohama, Japan

[73] Assignee: Nifco, Inc., Japan

[21] Appl. No.: 456,673

[22] Filed: Jun. 1, 1995

[30] Foreign Application Priority Data

Jun. 15, 1994 [JP] Japan .................................. 6-133426

[51] Int. Cl.⁶ ...................................................... F16B 13/06
[52] U.S. Cl. ......................................................... 411/48; 411/45
[58] Field of Search ................................... 411/45, 46, 47, 411/48, 51, 57, 60, 508, 908

[56] References Cited

U.S. PATENT DOCUMENTS

| | | | |
|---|---|---|---|
| 3,650,173 | 3/1972 | Mathe | 411/45 |
| 4,263,833 | 4/1981 | Loudin et al. | |
| 4,311,421 | 1/1982 | Okada et al. | |
| 4,367,995 | 1/1983 | Mizusawa et al. | |
| 4,874,276 | 10/1989 | Iguchi | 411/48 |
| 5,085,545 | 2/1992 | Takahashi | 411/45 |
| 5,211,519 | 5/1993 | Saito | 411/45 |
| 5,370,484 | 12/1994 | Morikawa | 411/60 |
| 5,375,954 | 12/1994 | Eguchi | 411/48 |

*Primary Examiner*—Flemming Saether
*Attorney, Agent, or Firm*—Parkhurst, Wendel & Burr, L.L.P.

[57] ABSTRACT

A clip which is comprised of a male member and a female member. The male member is inserted into the female member, and an inserting portion of a leg of the male member passes through split pieces of the female member. The clip in which the male member and the female member are assembled is inserted into through holes in panels to be fastened. When the male member is slightly pulled back, tip ends of the split pieces are engaged in engaging holes in the inserting portion, allowing the clip to be pressed in with the split pieces set in a state of reduced diameter. When the fastened state of the panels is canceled, the male member is pulled out, and the tip ends of the split pieces are engaged in the engaging holes in the inserting portion while being guided by guide grooves. As a result, the diameter of the tip ends of the split pieces is reduced, and the clip is pulled out with the female member held integrally with the male member. Therefore, even though the split pieces have undergone creep deformation and their diameter cannot be resiliently reduced, the clip can be removed with a small pulling-out force.

19 Claims, 10 Drawing Sheets

CLIP

BACKGROUND OF THE INVENTION

1. Field of the Invention

The present invention relates to a clip for fastening a plurality of members to each other.

2. Description of the Related Art

As shown in FIG. 9, conventionally, there are cases where a clip 70 is used instead of a screw, an adhesive or the like so as to simplify assembling operation when a panel 66 and a panel 68 are fastened to each other.

The clip 70 is comprised of a male member 72 and a female member 74. The female member 74 has a pair of split pieces 76 which are formed by slitting a hollow cylindrical member along its axial direction, and are hence resiliently expandable and contractible. Tips of the split pieces 76 are connected to each other by means of a tongue 64 which can be bent at a hinge 62 provided at its intermediate portion.

A cylindrical leg 78 which makes up a portion of the male member 72 is adapted to be inserted into the female member 74. When the leg 78 is pressed into a hollow portion formed between the pair of split pieces 76, the diameter of the split pieces 76 becomes larger than the diameter of through holes 80 which are respectively formed in the panels 66 and 68, so that outer peripheral portions of the split pieces 76 are retained at peripheral edges of the through holes 80, thereby fastening the panels 66 and 68 to each other as shown in FIG. 9.

If the tips of the split pieces 76 are thus connected to each other by the tongue 64, the amount of contraction in the diameter of the split pieces 76 is restricted, so that frictional force which is required to pressingly insert the female member 74 into the holes 80, becomes large. For this reason, in cases where the panels 66 and 68 are formed of a soft material, the through holes 80 can become distorted when the female member 74 is press-fitted.

In addition, if the split pieces 76 of the female member 74 remain in a state of enlarged diameter over a long period of time, there are cases in which, at the time of removing the clip 70 from the panels 66 and 68, the diameter of the split pieces 76 is not sufficiently reduced due to creep deformation, consequently only the male member 72 is removed and the female member 74 remains in the through holes 80.

Moreover, even if the clip 70 in the above-described state could be removed, when the clip 70 is reused, as shown in FIG. 10, the tongue piece 64 which has undergone creep deformation can possibly abut against an upper peripheral edge of the through hole 80 and is thereby buckled, making it impossible to insert the female member 74 in a satisfactory manner.

SUMMARY OF THE INVENTION

In view of the above-described circumstances, it is an object of the present invention to provide a clip which facilitates insertion into through holes of panels when the clip is reused, and which allows a male member and a female member to be easily removed from the panels when the clip is removed therefrom.

To this end, in accordance with the present invention, there is provided a clip which is comprised of a female member including a plurality of split pieces which are formed by slitting a hollow cylindrical member with a tapered tip end along an axial direction to be resiliently deformable in expanding and contracting directions and have their tip end portions inclined in mutually approaching directions, and a flange provided at proximal ends of said split pieces and having a circular hole communicating with a hollow portion formed by said split pieces; and a male member including a head capable of being fitted to said circular hole, a leg which extends from said head and is capable of axially moving reciprocatingly in said hollow portion formed by said split pieces, and has an abutment portion provided at a vicinity of a tip end of said leg to expand said split pieces, and an inserting portion with a shape of a frustum of a circular cone provided at the tip end of said leg to be passed through the hollow portion formed by said split pieces at tip ends thereof, and engaging holes which are formed in a surface of said inserting portion and are capable of being engaged with the tip ends of said split pieces.

With the clip in accordance with the present invention, the male member is inserted into the circular hole in the female member, and the inserting portion with the shape of a frustum of a circular cone provided on the leg is passed through the tip ends of the split pieces, thereby fitting the male member to the female member. Subsequently, the assembled male member is press-fitted into through holes formed in a first member and a second member superposed on top of the other. At this time, since the tip end portions of the split pieces are inclined in mutually approaching directions, the tip end portions of the slit pieces are guided by a peripheral edge of an upper one of the through holes, thereby allowing the inserting operation to be effected smoothly.

When, the head of the male member is pushed in until the head of the male member is fitted in the circular hole formed in the flange of the female member, the split pieces are expanded from the inside by the abutment portion, and the diameter of the split pieces is thereby enlarged. Hence, the outer peripheral surfaces of the split pieces are retained at a peripheral edge of a lower one of the through holes. Thus, the first and second members are firmly clamped by the flange and the split pieces.

When the first and second members are disassembled, if the leg of the male member is pulled out, the tip ends of the split pieces engage in the engaging holes provided in the inserting portion which is passed through the tip ends of the slit pieces, and the clip is pulled out with the female member held integrally with the male member. Accordingly, even if the split pieces have undergone creep deformation and their diameter cannot be resiliently contracted, since the tip ends of the split pieces are engaged in the engaging holes, the diameter of the split pieces is contracted, so that the clip can be removed with a small pulling-out force.

The above and other objects, features and advantages of the present invention will become more apparent from the following detailed description of the invention when read in conjunction with the accompanying drawings.

DESCRIPTION OF THE PREFERRED EMBODIMENTS

Figure 1:
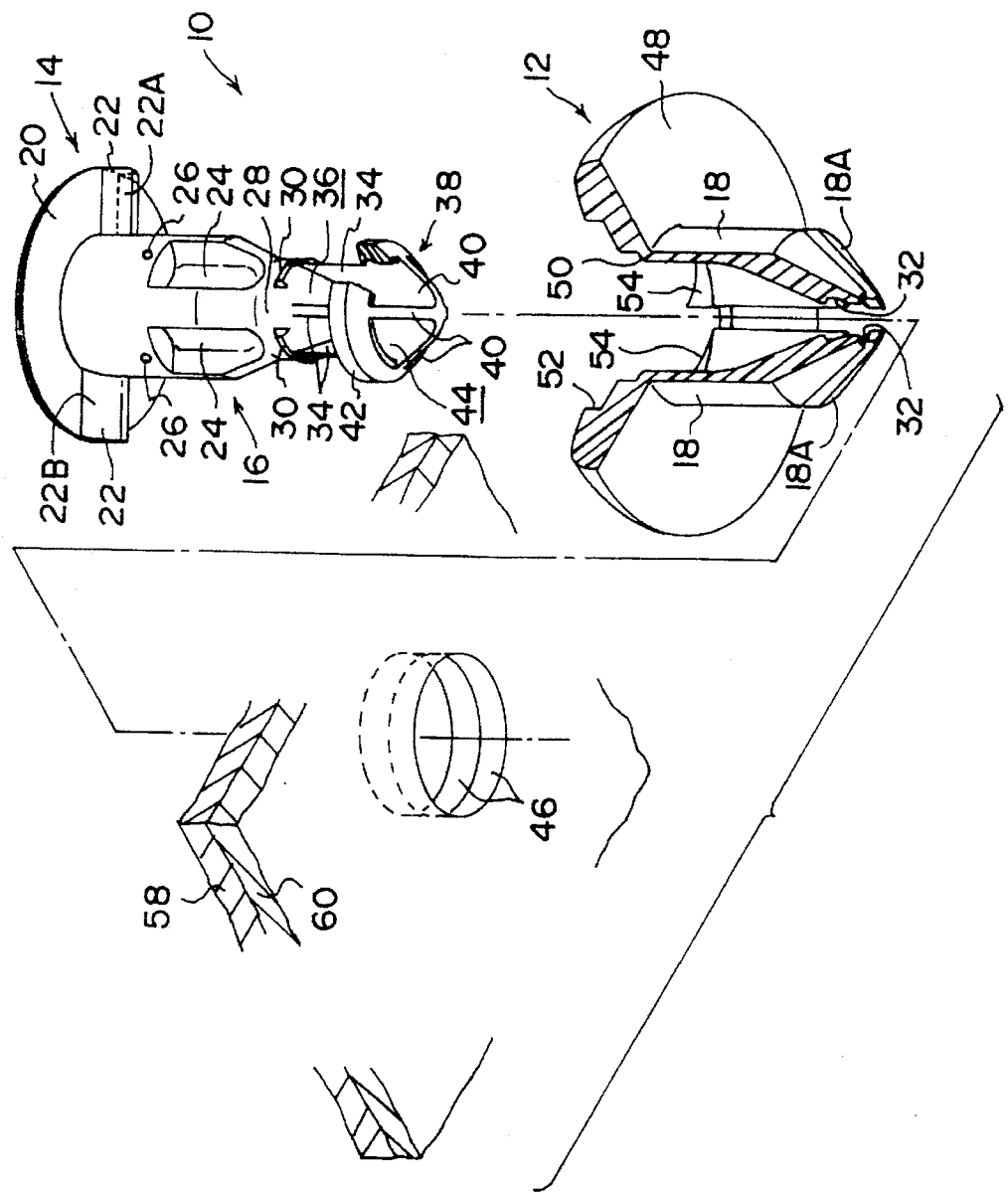
FIG. 1 is an exploded perspective view of a clip in accordance with a first embodiment of the present invention.
Figure 2:
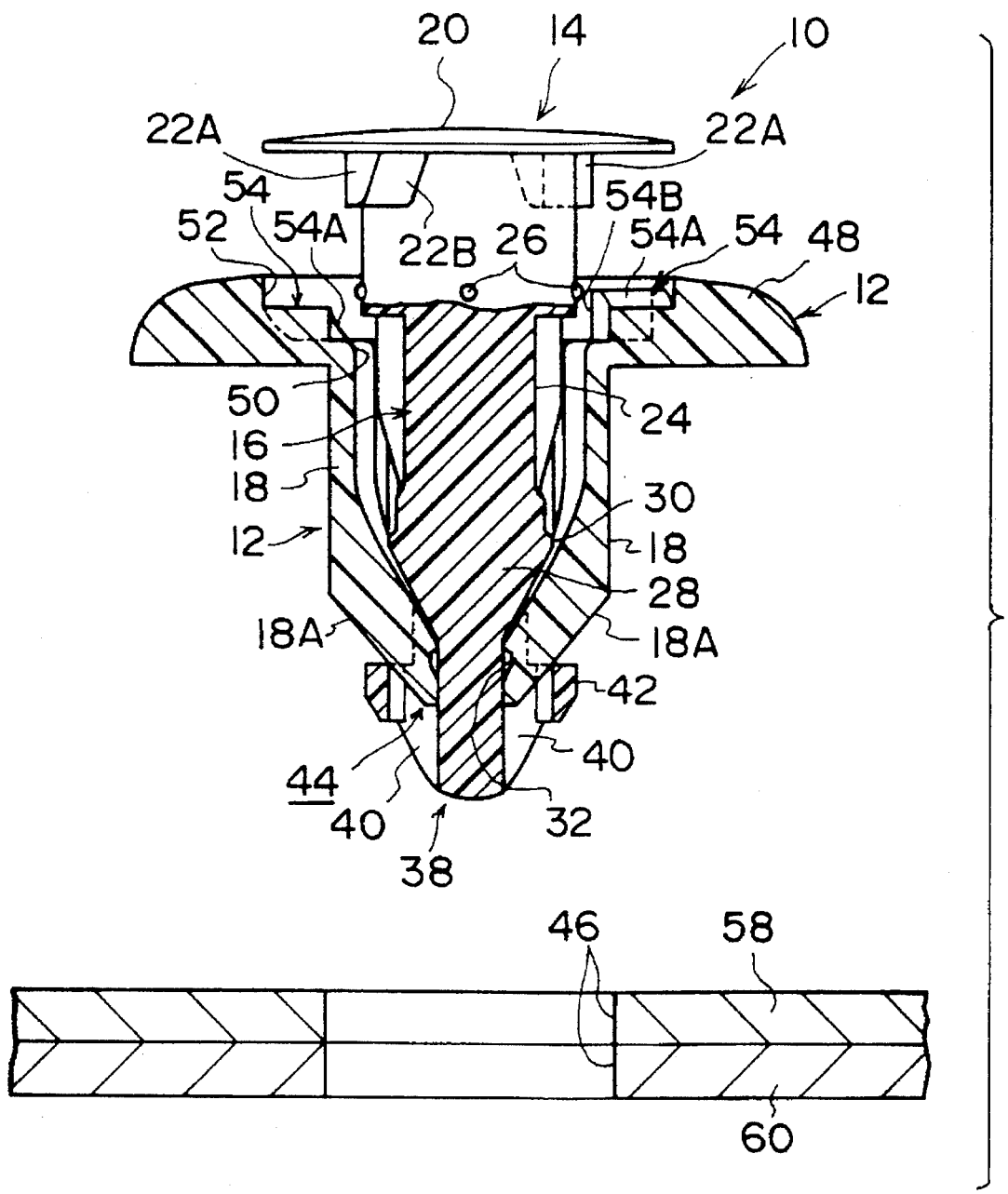
FIG. 2 is a cross-sectional front view illustrating a first step of a procedure for fastening panels by using the clip in accordance with the first embodiment.

As shown in FIGS. 1 and 2, a clip 10 in accordance with a first embodiment is comprised of a female member 12 and a male member 14 which is fitted in the female member 12.

The male member 14 has a cylindrical leg 16. A size of the diameter of the leg 16 is determined to be of such a size that the leg 16 is capable of passing through a hollow portion formed by inner peripheral surfaces of split pieces 18 of the female member 12.

Meanwhile, a disk-shaped head 20 is provided at a proximal end of the leg 16. A pair of guide pieces 22 are formed on a rear surface of the head 20 to extend in radially opposite directions from the leg 16 to an outer periphery of the head 20. Each of the guide pieces 22 has one side surface formed as an upright surface 22A, which is orthogonal to the rear surface of the head 20, and another side surface formed as a guide surface 22B, which is inclined toward the upright surface 22A. In addition, a cruciform screw hole 49 (see FIG. 5) is formed on the top surface of the head 20.

Four elongated recesses 24 are formed in an intermediate portion of the leg 16 along the axial direction thereof such that the leg 16 in a horizontal cross-sectional view is provided with a cruciform shape. Projections 26 are provided on the leg 16 on the proximal-end peripheral portion adjacent to the elongated recesses 24, respectively, and are adapted to be press-fitted to proximal-end portions of inner surfaces of the split pieces 18 which will be described below (see FIG. 4). An end portion of each elongated recess 24 reaches a vicinity of an intermediate portion of a conical portion 28 which is provided at an end portion of the leg 16 and is tapered to its end. Protrusions 30, each having a length corresponding to the width of the elongated recess 24 and extending in the circumferential direction, are provided on the tapered surface of the conical portion 28. The protrusions 30 are adapted to engage with notched portions 32 formed in inner surfaces of the split pieces 18 at tip ends thereof (see FIG. 4).

Plate-like portions 34, which respectively extend from the protrusions 30 toward the tip ends and protrude radially in a cruciform shape, are provided on the tapered surface of the conical portion 28. The plate-like portions 34 are on extended lines of the cruciformly cut-out remaining portions of the leg 16, and a space between adjacent ones of the plate-like portions 34 forms a guide groove 36.

An inserting portion 38 is provided at the tip ends of the plate-like portions 34. The inserting portion 38 is comprised of a plurality of triangular plates 40 that are respectively provided at the tip ends of each of the plate-like portions 34. Four triangular plates 40 are disposed in the first embodiment. The triangular plates 40, when viewed from the tip-end direction of the male member 14, are formed in a cruciform shape, and their outer surfaces are inclined in a direction away from the axis of the leg 16, and are hence formed in the shape of the frustum of a circular cone. In addition, the proximal ends of the triangular plates 40 are connected to each other by means of an annular member 42 which projects radially outwardly of the plate-like members 34. Consequently, fan-shaped engaging holes 44 are respectively formed by adjacent ones of the triangular plates 40 and the annular member 42.

Meanwhile, the female member 12 has four split pieces 18 which are formed by slitting a hollow cylindrical member with a cortically tapered tip end into quarters along its axial direction, and are hence capable of being resiliently expanded and contracted. Tip-end portions of the split pieces 18 are provided with a greater wall thickness, and has a hollow portion tapered toward the tip ends. For this reason, when the inserting portion 38 is inserted, the inserting portion 38 is guided to the center of the split pieces 18 while the inclined surfaces of the triangular plates 40 are brought into sliding contact with the inner surfaces of the split pieces 18. In addition, inclined surfaces 18A, which extend toward the central axis, are formed on the outer peripheries of the split pieces 18 at the tip ends thereof. By virtue of the action of the inclined surfaces 18A, the split pieces 18 can be easily inserted into through holes 46 which are respectively formed in panels 58 and 60.

The retaining notched portions 32 are formed in the inner surfaces of the split pieces 18 by partially notching the inner surfaces. The notched portions 32 are adapted to engage the protrusions 30 on the male member 14, so that the male member 14 is locked.

Meanwhile, a circular flange 48 is provided on distal end portion of the split pieces 18. An inserting hole 50, which communicates with the hollow portion formed by the split pieces 18, is provided in the flange 48. The inside diameter of the inserting hole 50 at its peripheral edge portion is enlarged, thereby forming a counterbored portion 52. Four cams 54 are provided uprightly on the annular bottom surface of the counterbored portion 52 to extend along the inner surface of the inserting hole 50. An inclined surface 54A extending toward the bottom surface of the counterbored portion 52 is formed on each of the cams 54. In addition, a retaining surface 54B, which drops vertically from the top of the inclined surface 54A to the bottom surface of the counterbored portion 52, is formed on an extended line of each of the slits dividing the split pieces 18.

As a result, when the male member 14 is inserted into the female member 12 while the male member 14 is rotated, the guide surfaces 22B of the guide pieces 22 can be slid on the inclined surfaces 54A of the cams 54 while the head 20 is being rotated by 90 degrees, thereby making it possible to allow the head 20 to engage with the counterbored portion 52.

Further, a description will be given of an operating procedure for fastening the panels 58 and 60 by using the clip 10 in accordance with this embodiment.

Figure 3:
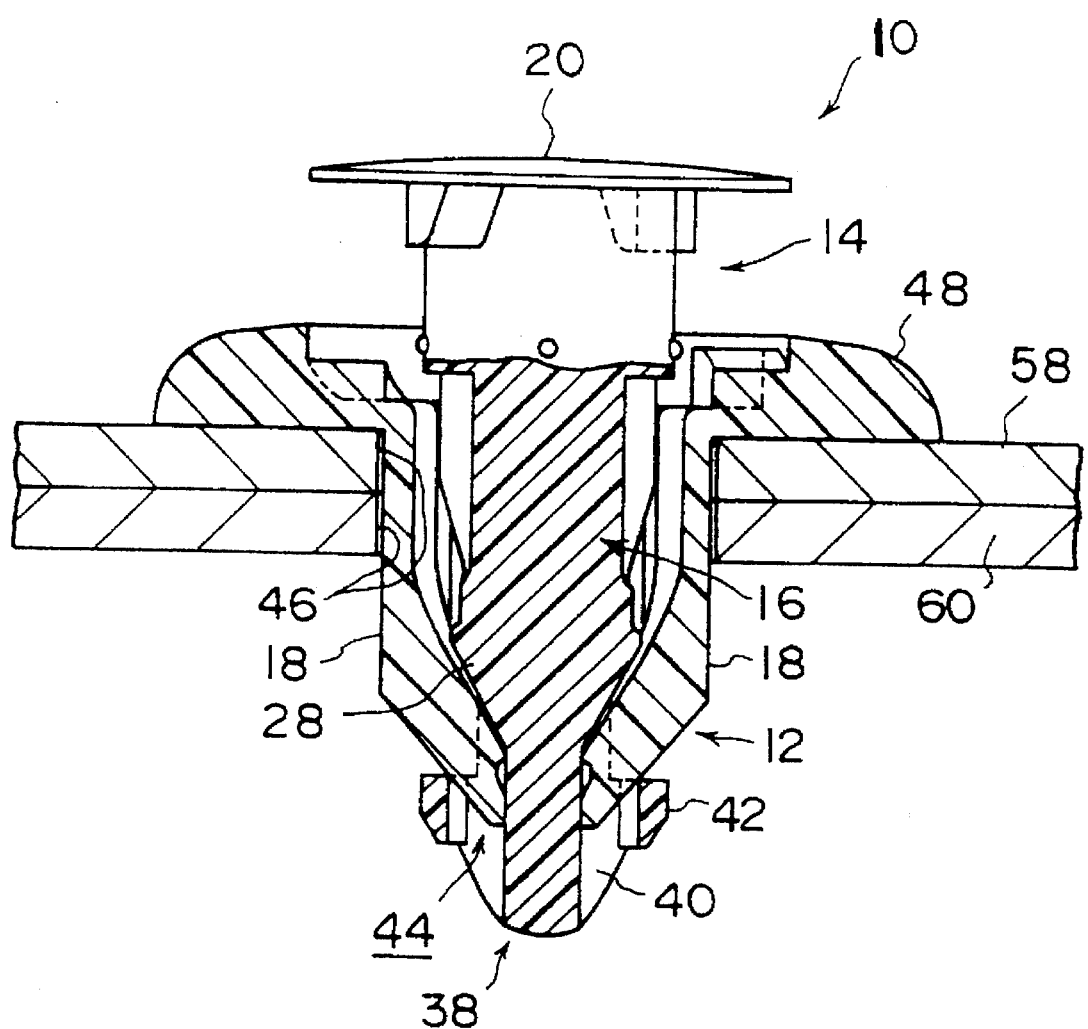
FIG. 3 is a cross-sectional front view illustrating a second step of the procedure for fastening the panels by using the clip in accordance with the first embodiment.

As shown in FIG. 2, in a state of the clip in which the male member 14 is inserted into the female member 12 with the inserting portion 38 of the leg 16 passed through the split pieces 18, the clip 10 is inserted into the through holes 46 in the panels 58 and 60. For example, even if the split pieces 18 have undergone creep deformation and their diameter cannot be resiliently contracted owing to the repeated use of the clip 10, the male member 14 is slightly pulled back, as shown in FIG. 3, the tip ends of the split pieces 18 can be engaged in the engaging holes 44 of the inserting portion 38, so that the clip 10 can be pressed in with the split pieces 18 set in a state of contracted diameter. Hence, the clip 10 can be inserted smoothly into the through holes 46 while the female member 12 is guided by the inserting portion 38 formed in the shape of the frustum of a circular cone.

Figure 4:
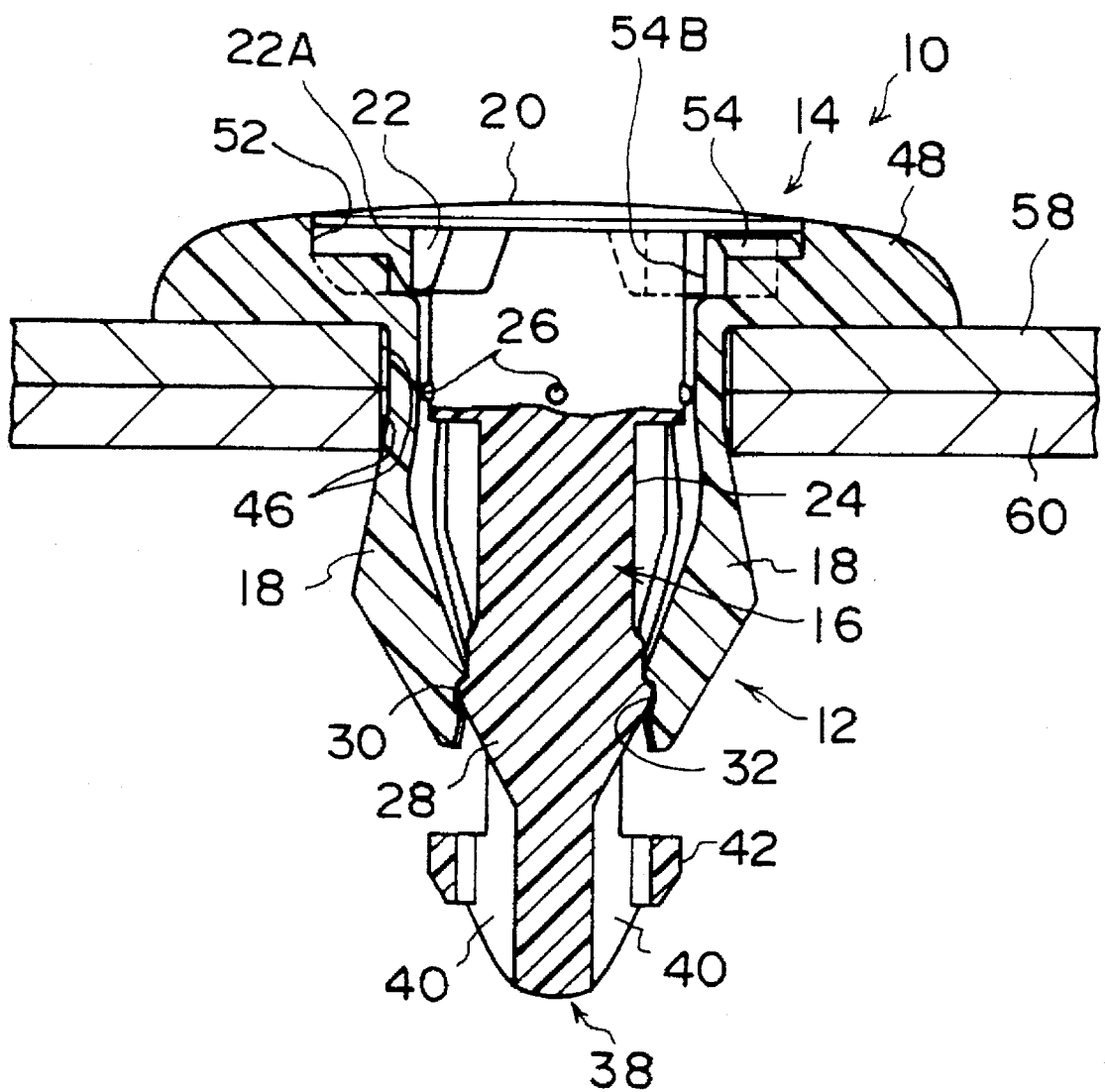
FIG. 4 is a cross-sectional front view illustrating a third step of the procedure for fastening the panels by using the clip in accordance with the first embodiment.
Figure 5:
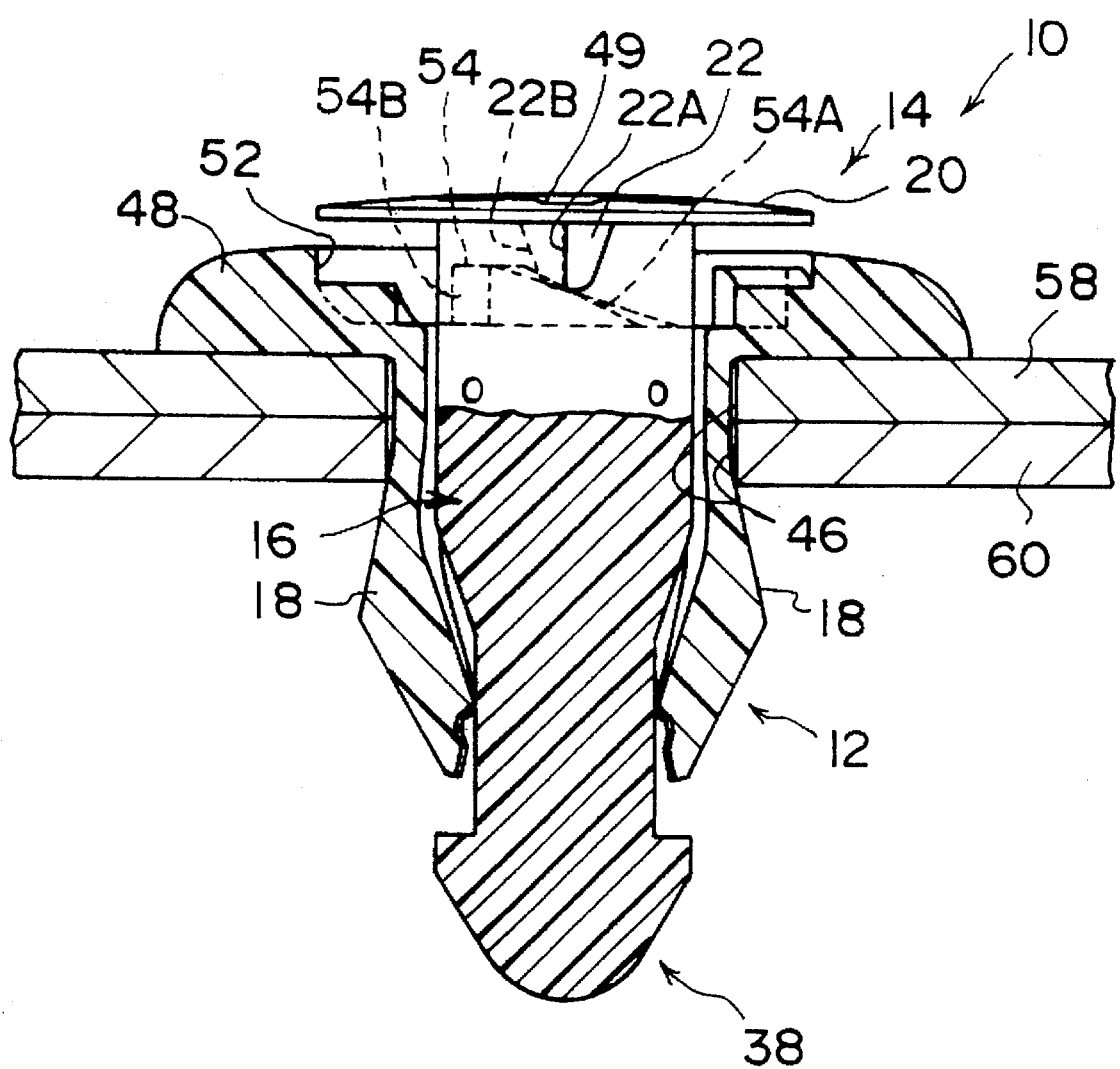
FIG. 5 is a cross-sectional side view illustrating a fourth step of the procedure for fastening the panels by using the clip in accordance with the first embodiment.

As shown in FIGS. 4 and 5, when the male member 14 is further pressed in and the head 20 is rotated through 90 degrees, the upright surfaces 22A of the guide pieces 22 provided uprightly from the rear surface of the head 20 abut against the engaging surfaces 54B of the cams 54, thereby allowing the head 20 to be fitted to the counterbored portion 52.

At this time, the split pieces 18 are expanded from the inside by the protrusions 30 formed on the tapered surface of the conical portion 28 provided at the tip end of the leg 16. Consequently, the diameter of the split pieces 18 is enlarged, so that their outer peripheral surfaces are retained at a peripheral edge of the through hole 46 in the panel 60. Hence, the panels 58 and 60 are firmly clamped by the flange 48 and the split pieces 18.

At this time, the notched portions 32 in the split pieces 18 engage the protrusions 30 so as to lock the male member 14 against the female member 12, and, simultaneously, the projections 26 are brought into pressure contact with the inner surfaces of the split pieces 18 at the tip ends thereof, thereby eliminating a clearance between the male member 14 and the female member 12.

On the other hand, when the fastened state of the panels 58 and 60 is canceled, by turning a screwdriver which is fitted in the screw hole 49 of the head 20, the head 20 is rotated while the guide surfaces 22B of the guide pieces 22 are slid on the inclined surfaces 54A of the cams 54, and the head 20 is pushed out from the counterbored portion 52 by the diameter-reducing force of the split pieces 18.

Figure 6:
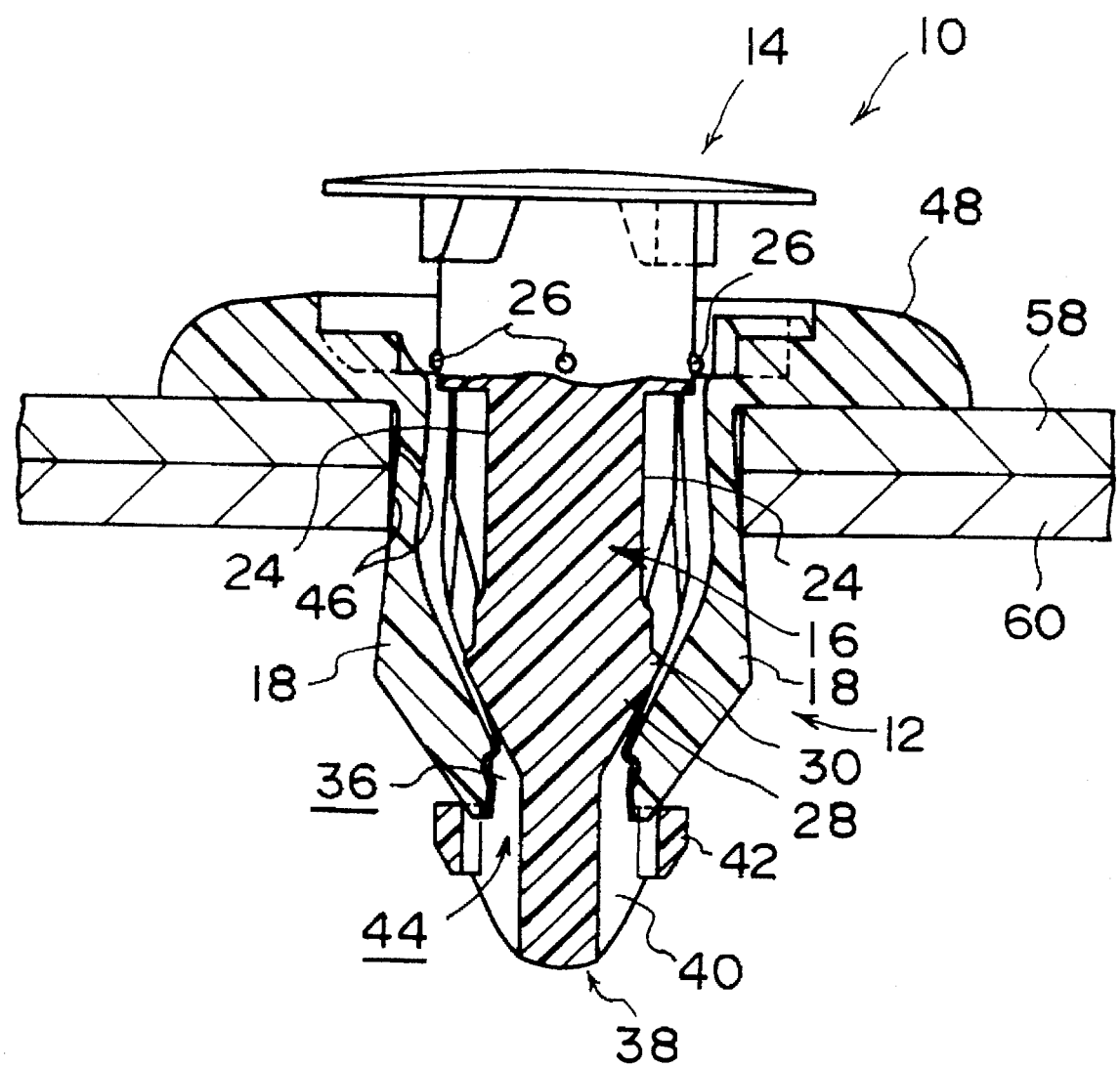
FIG. 6 is a cross-sectional front view illustrating a fifth step of a procedure for removing the clip from the panels in accordance with the first embodiment.

Here, when the head 20 is nipped with fingers and the male member 14 is pulled out, as shown in FIG. 6, the tip ends of the split pieces 18 are engaged in the engaging holes 44 in the inserting portion 38 while the tip ends of the split pieces 18 are being guided by the guide grooves 36. As a result, the diameter of the tip ends of the split pieces 18 is contracted or reduced, and the clip 10 is pulled out with the female member 12 held integrally with the male member 14. Therefore, even if the split pieces 18 have undergone creep deformation and their diameter cannot be resiliently contracted, the clip 10 can be removed with a small pulling-out force.

A second embodiment of the present invention is described below.

Figure 7:
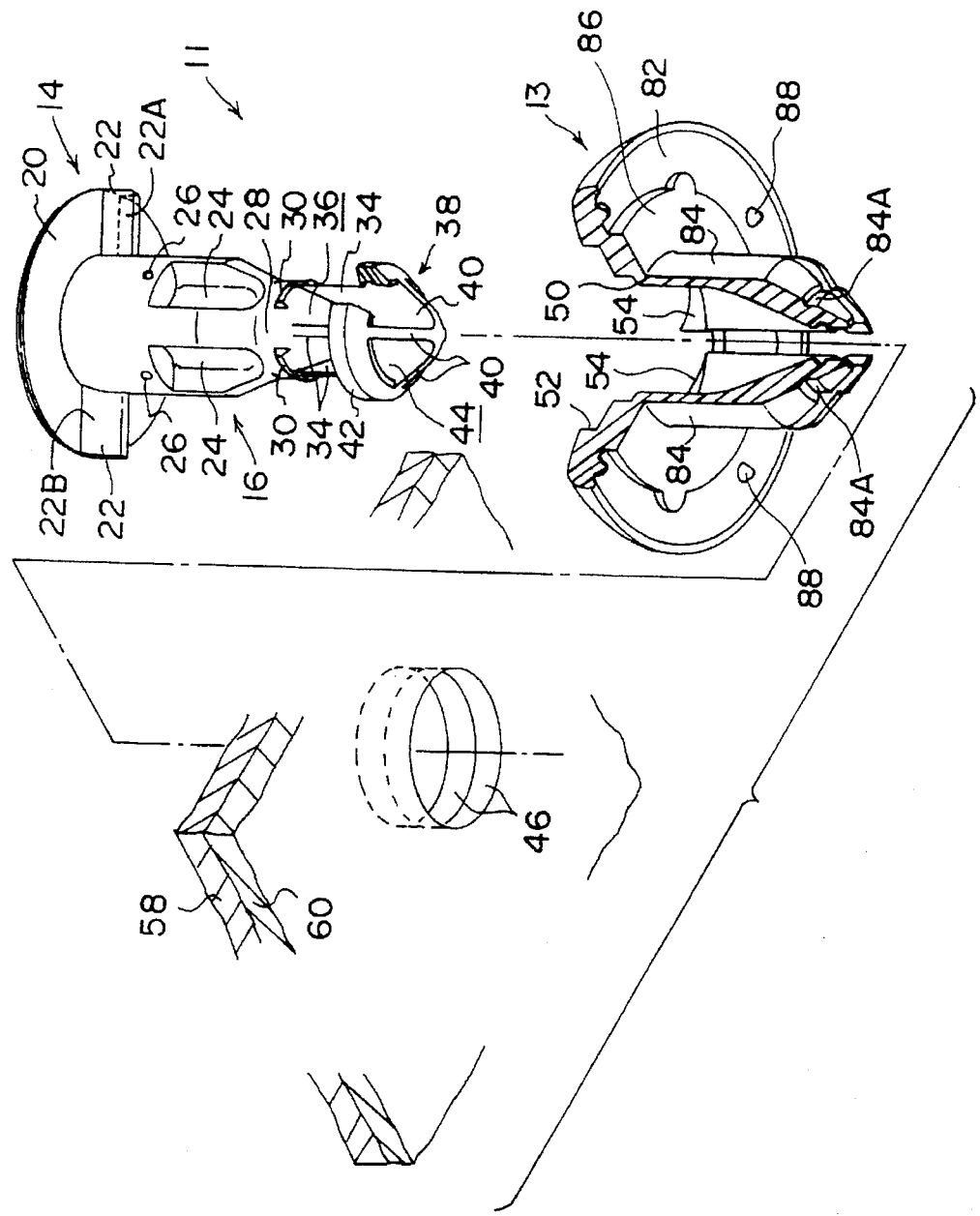
FIG. 7 is an exploded perspective view of a clip in accordance with a second embodiment of the present invention.
Figure 8:
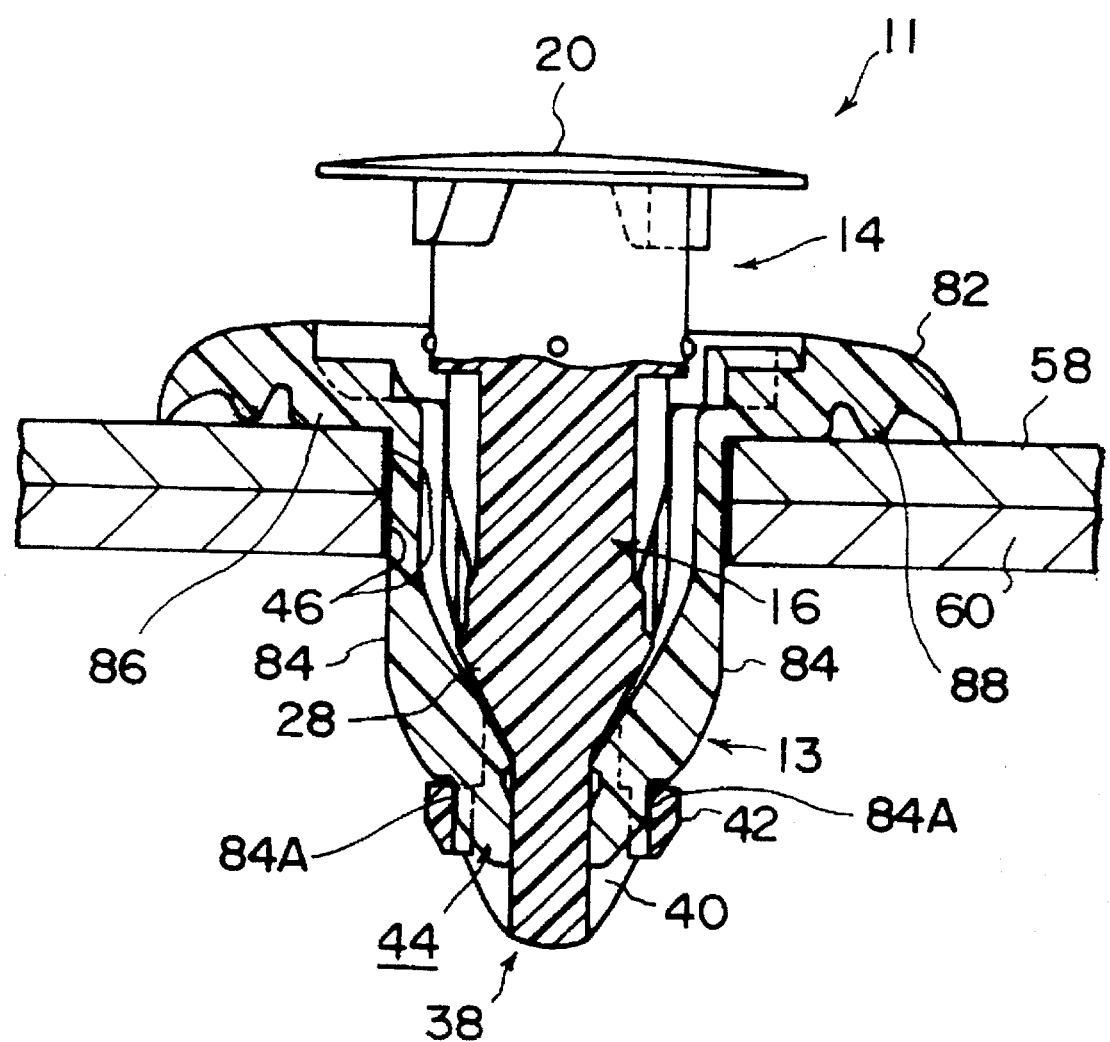
FIG. 8 is a cross-sectional side view illustrating a state in which the clip in accordance with the second embodiment is being removed from the panels.
Figure 9:
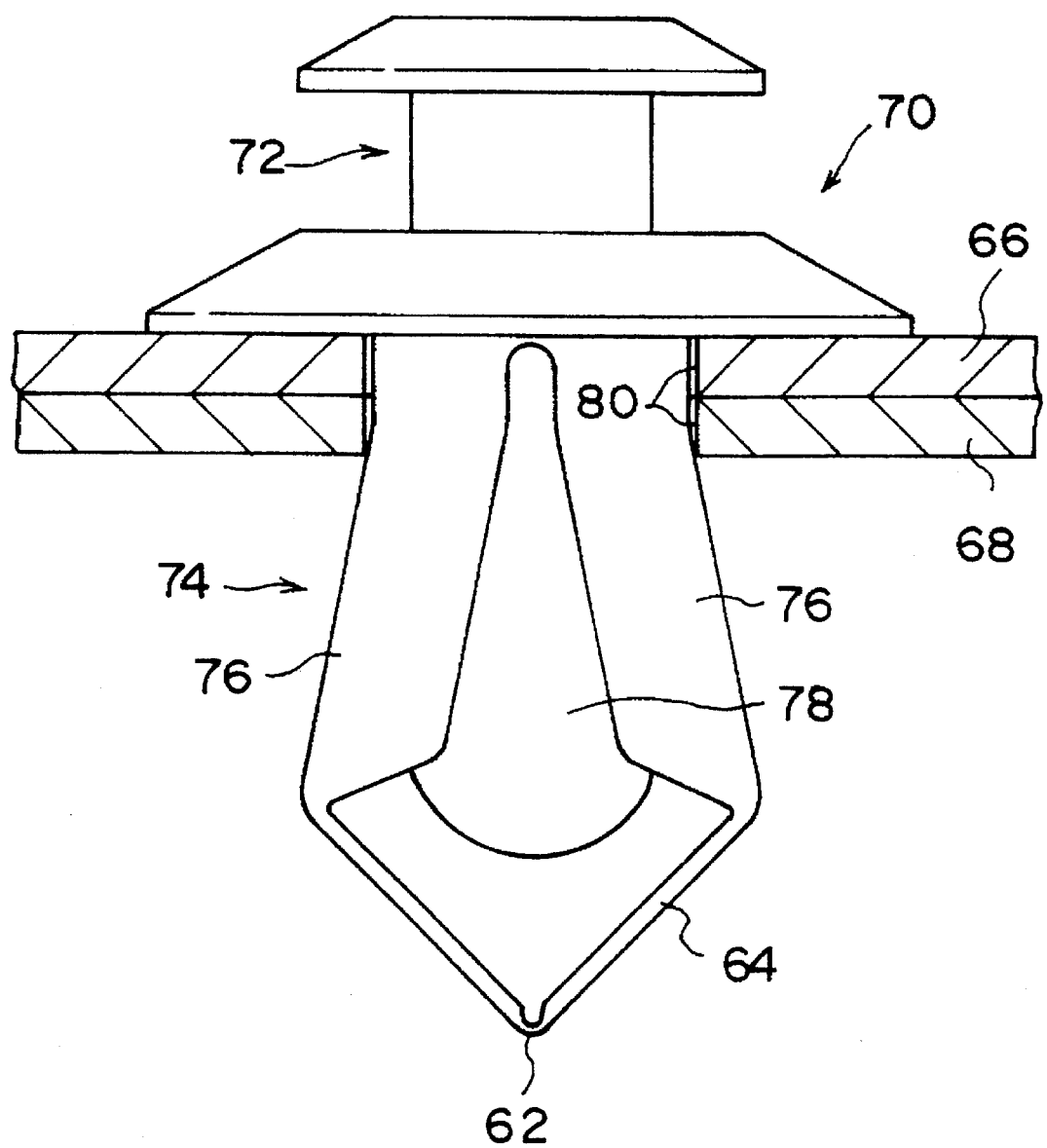
FIG. 9 is a cross-sectional view illustrating a state in which a conventional clip is fitted in panels.
Figure 10:
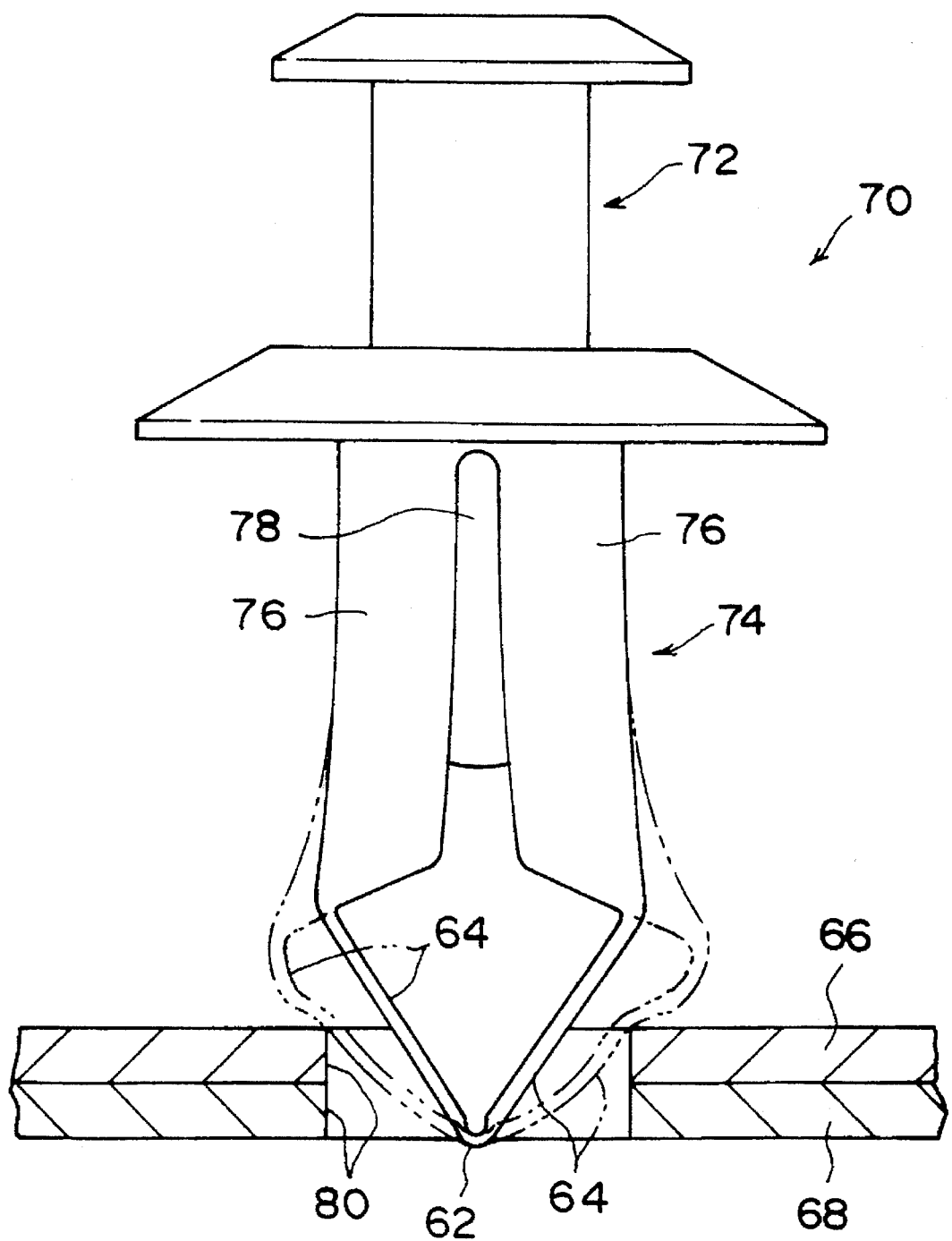
FIG. 10 is a cross-sectional view illustrating a state in which an attempt is being made to insert the conventional clip into through holes.

As shown in FIGS. 7 and 8, in a clip 11 in accordance with the second embodiment, a recess with a curved cross section is formed in the rear surface of a flange 82 of a female member 13, so that an outer peripheral portion of the rear surface of the flange 82 is brought into linear contact with the panel 58. In addition, a connecting portion between split pieces 84 and the flange 82 is formed as a circular enlarged-thickness portion 86, and small conical bosses 88 are projectingly provided at equal intervals along the circumferential direction between the enlarged-thickness portion 86 and the outer peripheral portion of the flange 82.

Accordingly, a result, as shown in FIG. 8, when the female member 13 is inserted into the through holes 46, the bosses 88 are resiliently pressure-fitted to the panel 58, so as to prevent the female member 13 from rotating together with the male member 14.

Meanwhile, the inclined portions of the split pieces 84 are rounded as a whole, and annular upright surface portions 84A, which are formed by notching the outer surfaces of the inclined portions so as to be parallel with the inserting direction of the female member 13, are formed in the vicinities of the tip ends of the inclined portions of the split pieces 84. As shown in FIG. 8, the upright surface portions 84A are adapted to be brought into planar contact with walls of the engaging holes 44 which are formed in the inserting portion 38 of the male member 14.

Here, a description will be given of the operation of the clip 11 in accordance with this embodiment.

With the clip 11, when the leg 16 of the male member 14 is pulled out, the upright surface portions 84A of the split pieces 84 engage in the engaging holes 44, as shown in FIG. 8. In other words, since the engaging holes 44 are not brought into linear contact with the inclined surfaces 18A of the split pieces 18 as with the clip 10 of the first embodiment, but are brought into planar contact therewith, the force for contracting the diameter of the split pieces 84 which have undergone creep deformation becomes large.

In addition, since the bosses 88 on the rear surface of the flange 82 are pressure-fitted to the panel 58 at predetermined intervals, the female member 13 is prevented from rotating together with the male member 14. Consequently, the inserting force and the pulling-out force act on the clip 11 effectively.

What is claimed is:

1. A clip fastener, comprising:

a female member comprising a cylindrical member having first and second opposite ends, and a hollow interior portion, the first end forming a tapered tip and the second end having a flange extending therefrom, the tapered tip having a notched portion and the flange having a circular hole which is in communication with said hollow interior portion, said cylindrical member having a plurality of slits extending through the tip portion and axially along the cylindrical member to divide the cylindrical member into a plurality of split pieces that are deformable along expanding and contracting directions, the notched portion being divided into a plurality of notches respectively located along an interior of the plurality of split pieces; and a male member comprising a head for fitting into the circular hole of the flange of the female member, and a leg extending from said head and into the hollow interior portion of the female member, said leg having (i) protrusions annularly spaced apart from each other along an axially intermediate portion of the leg, said protrusions being adapted to fit in said notches of the female member, (ii) a frustoconical inserting portion forming an end of the leg, (iii) an abutment portion extending from the inserting portion, said abutment portion comprising an annular member for expanding the plurality of split pieces of said female member along the expanding direction, wherein the abutment portion defines engaging holes for respectively engaging an exterior of the split pieces along the tapered tip of the female member.

2. The clip of claim 1, wherein said male member further includes guide grooves extending along the leg for guiding the ends of the split pieces along the tapered tip thereof into the engaging holes.

3. The clip of claim 2, further comprising a plurality of plate-like members projecting radially from an outer surface of said leg, the guide grooves being defined between adjacent plate-like members.

4. The clip of claim 1, wherein the circular flange includes a counterbored portion for receiving the head of the male member.

5. The clip of claim 4, wherein the male member further comprises a plurality of guide pieces projecting from a bottom surface of the head and said female member includes a plurality of cams provided in said counterbored portion of said female member to guide the guide pieces upon rotation of the leg.

6. The clip of claim 1, wherein said flange of said female member has an enlarged-thickness circular portion that is formed along a central region of said flange, and an annular groove is provided along a bottom surface of the flange, between said enlarged-thickness circular portion and an outer peripheral edge of the flange.

7. The clip of claim 6, further comprising projections extending from the annular groove at predetermined intervals.

8. The clip of claim 1, wherein the male member further comprises projections provided on an outer peripheral surface of said leg.

9. The clip of claim 1, wherein the hollow interior portion of said female member has a conical shape that tapers toward the tapered tip of the female member.

10. The clip of claim 1, wherein the inserting portion of the male member comprises a plurality of radially extending triangular plates having exposed outer edges that form a generally frustoconical shape, said annular member interconnects radially outermost corners of the triangular plates, and the engaging holes are bounded by an interior surface of said annular member and adjacent triangular plates.

11. The clip of claim 1, wherein said male member has a cruciform screw hole extending into a top surface of the flange.

12. A clip fastener, comprising:

a female member comprising a cylindrical member extending along an axial direction and having a first and second opposite ends and a hollow interior portion, the first end forming a tapered tip and the second end having a flange extending therefrom, the tapered tip having an interior notched portion and an exterior notched portion, the flange having a circular hole which is in communication with said hollow interior portion, said cylindrical member having a plurality of slits extending through the tip portion and axially along the cylindrical member to divide the cylindrical member into a plurality of split pieces that are deformable along expanding and contracting directions, the interior notched portion being divided into a plurality of interior notches respectively located along an interior of the plurality of split pieces, and the exterior notched portion being divided into a plurality of exterior notches each having an outer surface portion that extends substantially parallel to the axial direction; and a male member comprising a head for fitting into the circular hole of the flange of the female member, and a leg extending from said head and into the hollow interior portion of the female member, said leg having (i) protrusions annularly spaced apart from each other along an axially intermediate portion of the leg, said protrusions being adapted to fit in said interior notches of the female member, (ii) a frustoconical inserting portion forming an end of the leg, (iii) an abutment portion extending from the inserting portion, said abutment portion comprising an annular member for expanding the plurality of split pieces of said female member along the expanding direction, wherein the abutment portion defines engaging holes extending into said inserting portion for respectively engaging the split pieces along the exterior notches thereof.

13. The clip of claim 12, wherein said split pieces have a rounded outer contour.

14. The clip of claim 13, wherein said male member further includes guide grooves extending along the leg for guiding the ends of the split pieces along the tapered tip thereof into the engaging holes.

15. The clip of claim 12, wherein the circular flange includes a counterbored portion for receiving the head of the male member.

16. The clip of claim 12, wherein said flange of said female member has an enlarged-thickness circular portion that is formed along a central region of said flange, and an annular groove is provided along a bottom surface of the flange, between said enlarged-thickness circular portion and an outer peripheral edge of the flange.

17. The clip of claim 16, further comprising projections extending from the annular groove at predetermined intervals.

18. The clip of claim 12, wherein the male member further comprises projections provided on an outer peripheral surface of said leg.

19. A clip fastener, comprising:

a female member comprising a cylindrical member having first and second opposite ends and a hollow interior portion, the first end forming a tapered tip and the second end having a flange extending therefrom, the flange having a circular hole which is in communication with said hollow interior portion, said cylindrical member having a plurality of slits extending through the tip portion and axially along the cylindrical member to divide the cylindrical member into a plurality of split pieces that are deformable along expanding and contracting directions; and a male member comprising a head for fitting into the circular hole of the flange of the female member, and a leg extending from said head and into the female member, said leg including a frustoconical tip including a large-diameter annular portion and a tapering portion extending axially from the annular portion, the annular portion being adapted to spread the split pieces of the female member along the expanding direction upon insertion of the male member into the female member, wherein said frustoconical tip includes a plurality of engaging holes extending axially through the frustoconical tip respectively corresponding to the plurality of split pieces, whereby the split pieces of the female member are respectively secured in the engaging holes upon retracting the male member from the female member after the male member is inserted fully into the female member, such that the split pieces are forcibly biased along the contracting direction thereby reducing an outer diameter of the female member.

* * * * *